United States Patent Office 3,033,700
Patented May 8, 1962

3,033,700
SILICA-COATED BARIUM METABORATE PIGMENTS AND PROCESSES OF PRODUCING THE SAME
Stanley J. Buckman, Raleigh, and John D. Pera, Memphis, Tenn., assignors to Buckman Laboratories, Inc., Memphis, Tenn., a corporation of Tennessee
No Drawing. Filed Dec. 14, 1959, Ser. No. 859,104
5 Claims. (Cl. 106—306)

The present invention relates to the production of barium metaborate pigments in particulate form that are improved with respect to hygroscopicity, noncaking tendencies, susceptibility to extraction by water, and to the formation of larger crystalline hydrates by growth in water.

The principal object of the present invention is to provide barium metaborate in a form in which it is less hygroscopic and less susceptible respectively to extraction by water, to formation of larger crystalline hydrates by growth in water, and to caking when stored as a dry product. A further object of the present invention is to provide a process of producing a barium metaborate particulate pigment conforming to these characteristics. Other objects and advantages, some of which are referred to more specifically hereinafter, will be apparent to those skilled in the art to which the invention pertains.

We have found that, when particles of barium metaborate are brought into contact with liquid sodium silicate in an aqueous alkaline environment, the barium metaborate particles become coated with a layer of amorphous hydrated silica and that, when these particles are separated and dried, they are less hygroscopic and less susceptible to extraction by water, less susceptible to the formation of larger particles of crystalline hydrates by growth in water, and less susceptible to caking than are uncoated barium metaborate particles.

We also have found that, when a liquid sodium silicate is present while barium metaborate is being formed by precipitation from a reaction mixture of barium sulfide and borax, the particles of the precipitated barium metaborate likewise become coated with silica, and that the silica appears to prevent agglomeration of the particles, thereby tending to produce smaller particles during the precipitation.

We also have found that barium metaborate will take up out of an aqueous solution of liquid sodium silicate at least 25 percent of its weight of silica, and that particles coated with as small a proportion as corresponds to 3 percent by weight of silica acquire characteristics such as those described. Particles coated by mere spraying with a dilute aqueous solution of liquid sodium silicate or with amounts such that proportions less than 3 percent of silica by weight are deposited, acquire some of these characteristics but are still unsatisfactory.

We also have found that other barium borates, for example, hydrates of barium tetraborate ($BaO \cdot 2B_2O_3$) and barium sesquiborate ($2BaO \cdot 3B_2O_3$) are not coated as readily as barium metaborate nor do they become as resistant to moisture absorption, to caking, and to extraction by water, and to the formation of larger particles of crystalline hydrates by growth in water, as do barium metaborate particles when coated with silica in accordance with the processes of this invention.

The utility of barium metaborate as a preservative pigment in oil and oil-emulsion paints was disclosed in U.S. Patent No. 2,818,344. It was recognized that barium borates were incompatible with many emulsion paint latexes and that their usefulness in such paints was limited by their solubility in water and their tendency to form progressively larger crystalline hydrates when suspended in water or emulsion-paint vehicles.

Processes have heretofore been disclosed for the coating of particles of water-soluble salts, such as ammonium nitrate, with small proportions of liquid sodium silicates to retard caking of the particles. Particles of water-insoluble pigments such as zinc sulfide and lithopones have also been coated with greater proportions of liquid sodium silicates, and with uncalcined amorphous gel-like silica and water-insoluble alkaline-earth-metal silicates, produced by reaction of a liquid sodium silicate with acids and water-soluble alkaline-earth-metal salts, respectively. The purpose of such coatings was usually to increase the hiding power of the pigments in paint vehicles. For reasons which will appear obvious from the description hereinafter, none of the prior known processes is adaptable to the coating of barium metaborate particles to produce the pigments of the present invention.

In accordance with one of the processes of our invention, particles of barium metaborate monohydrate or a polyhydrated barium metaborate are coated by suspending them in a dilute aqueous solution of a liquid alkali-metal silicate and heating the suspension for a short period at a temperature below 200° C. The heated mixture, before or after cooling but preferably while still warm, is filtered so as to separate the silica-coated barium metaborate particles, which are then dried.

Alternatively, the coating may be applied to barium metaborate during its preparation by precipitation, for example, by adding or including liquid sodium or other alkali-metal silicates in the reaction mixture, and thereafter heating and recovering the coated barium metaborate particles by filtration as before. In such alternative processes, the alkali-metal silicate may be added at any stage during the reaction. For example, if barium metaborate is being prepared by precipitation from barium sulfide and borax, the silicate may be added in solution or suspension with either of the reactants, or after all the reactants have been added, or the reactants may be added directly to a solution of alkali-metal silicate. The alkali-metal silicate may likewise be added in any of these manners during the preparation of barium metaborate from other reagents, which include barium hydroxide and other water-soluble barium salts for the barium sulfide, and boric acid or other water-soluble borate for the borax.

The alkali-metal silicates which may be used in the process of our invention include the liquid water-soluble silicates having a ratio by weight of alkali metal to silica of at least 2.5 grams of silica to each gram of alkali metal calculated as alkali-metal oxide. Commercially available products are the liquid silicates of sodium and potassium, having ratios by weight of alkali-metal oxide to silica up to 1:3.75 for sodium silicates, and up to 1:2.50 for potassium silicates, but known liquid sodium silicates having a ratio of sodium oxide to silica of 1:4.10 may also be used. The preferred liquid silicates, however, are sodium silicates having ratios between 3.22 to 3.75 grams of silica to each gram of sodium oxide ($Na_2O$), such as the aqueous fluid or liquid containing 25.3 percent by weight of silica ($SiO_2$) and 6.75 percent sodium calculated as sodium oxide ($Na_2O$), which has a ratio of $Na_2O:SiO_2$ of 1:3.75, that is referred to as liquid sodium silicate A, which is one of the products used in the following examples. Although such substances are known also by names such as soluble silicates, silicate solutions, and waterglass, we have selected for the purpose of referring to these substances throughout this specification the term "liquid silicate" together with such additional qualifying terms as seemed appropriate, since that appeared to be the most suitable generic term, which was also less likely to be misinterpreted than any others which are used for designating these substances. The term "liquid silicate" excludes glassy water-insoluble substances which are included in the term "soluble silicate" but includes all other water-soluble silicates and their aqueous solutions.

In coating the particles of barium metaborate effectively it is advantageous to have the liquid alkali-metal silicate distributed as uniformly as possible over the surfaces of the particles. For this purpose sufficient water should be present to produce a slurry that can be stirred easily and the amount should be such as not to excessively dilute the liquid sodium silicate.

The slurry of barium metaborate particles in water containing the liquid sodium silicate is then heated for a period such that an adherent coating is formed on the particles of barium metaborate. This can be generally accomplished by heating for a period between 1 and 6 or more hours at a temperature between approximately 75° and 200° C. This heating serves to insolubilize the silica coating on the particles and extract residual soluble alkali-metal salts that were introduced with the liquid alkali-metal silicate.

Heating an aqueous slurry of silica-coated barium metaborate particles at a temperature of 200° C. or lower for periods longer than 6 hours appears to produce no further change in the characteristics of the product. It has not been possible to produce by this process silica-coated barium metaborate particles that are completely insoluble in water.

The heating and agitating of the slurry serves to break up aggregated particles. When the barium metaborate is being prepared by precipitation in the presence of liquid alkali-metal silicates, the presence of the alkali-metal silicate serves to control the size of the particles being formed.

The products obtained in accordance with the process of this invention are distinguished from uncoated similarly precipitated barium metaborate particles by their comparative freedom from aggregated particles. The dried products are freer-flowing, less subject to caking, less hygroscopic, less soluble in water and have less tendency to form crystalline hydrates by growth in water than do uncoated barium metaborate particles.

The nature of the coating of silica that is produced on the barium metaborate particles in accordance with the processes of the present invention has not been established conclusively. It can be stated, however, that it is not a dense coating and that it is not impervious to water. The barium metaborate particle that is coated has been established by X-ray diffraction examination to be crystalline and identical with otherwise uncoated barium metaborate, and the silica in the coated particle to be amorphous and not crystalline, since it produced no diffraction pattern.

The alkali-metal content of the coated barium metaborate particles is always less than the amount of alkali metal contained in the liquid alkali-metal silicate that had been added to the barium metaborate, and in all cases is less than 15 percent of the weight of the silica coating deposited on the particle, the amount varying by the degree of heating and washing to which the particular coated particles have been subjected.

Barium metaborate particles that have been coated with between 3 and 25 percent of silica (based on the weight of barium metaborate) having a size not greater than 40 microns in diameter in accordance with the process of this invention are particularly useful as preservative pigments in paints, including oil paints in which uncoated barium borates are successfully used, as well as in water emulsion paints in the aqueous phase of which uncoated barium metaborate is too soluble, and in which it is incompatible with many latexes that are used in such paints. Furthermore, the resistance or inability of the silica-coated barium metaborate to grow by formation of larger hydrated crystalline particles makes these products eminently suitable for use in water emulsion paints.

Particles of barium metaborate coated in accordance with the processes of our invention with amounts of silica varying between 3 and 25 percent by weight (based on the barium metaborate which correspond to approximately 3 to approximately 20 percent by weight of the coated pigment) when extracted with water at 25° C., will yield extracts that contain dissolved solids in a proportion between 0.1 and 0.3 percent by weight of the extract, and which do not vary substantially from 0.2 percent by weight of the extract, the midpoint of this range. These extraction results are remarkably uniform and consistent over the entire range of 3 to 20 percent silica (based on the weight of pigment), regardless of the size of the particles, insofar as they are not more than 40 microns in diameter. On the other hand, when barium metaborate particles are coated with less than 3 percent by weight of silica, their extracts in water contain between 0.3 and 0.8 percent by weight of dissolved solids, and the proportions vary more widely and directly with the proportion of silica present on the particles.

The processes of our invention are not adaptable to the production of barium metaborate particles that are completely insoluble in water. A barium metaborate particle that is completely insoluble in water would not be a satisfactory preservative pigment for paints since such a preservative must be soluble in water to some extent. On the other hand, silica-coated barium metaborate particles which release barium metaborate more slowly from a paint film and do not grow in size by crystallization in water or other paint vehicle, are more desirable products than uncoated barium metaborate particles.

Barium metaborate particles coated with between 3 to 25 percent by weight of silica (based on the barium metaborate weight) are easier to disperse in paint mills than is uncoated barium metaborate. Particles having diameters less than 40 microns do not disintegrate or fracture appreciably in paint dispersing mills or rolls and retain all their essential characteristics. The particle size can be controlled by variations in the initial precipitation or by using particles of barium metaborate that have been screened or classified or preliminarily ground to a size suitable for coating. The processes of this invention are directed particularly to the production of particles having a diameter of not more than 40 microns after coating.

When particles of barium metaborate that have been completely coated with silica are extracted with water as described herein, the first and subsequent extracts will not differ substantially from each other and will contain not more than 0.3 percent by weight of dissolved solids. Higher percentages of total solids found in the extract are indicative primarily of particles of barium metaborate that have not been completely coated or particles whose silica coating has been abraded, exposing barium metaborate surfaces, for example, a powder which has been subjected to uncontrolled grinding after drying, in which the particles may be fractured or their coatings partially removed. Residues of mother liquors from which the particles were not completely freed before drying, or inadequate washing before drying, may also be responsible for a higher solids content of the first extract. Generally, however, all such soluble and uncoated or partially coated particles in the product sample are removed in the first and second extractions and the third and subsequent extracts have a lower and consistent solids content.

Preferred methods of practicing the processes of our invention and preferred products produced by such processes are illustrated in the examples which follow:

EXAMPLE 1

To a jacketed stainless-steel autoclave heated electrically were added with continual stirring 598.3 grams of a 16.5-percent barium sulfide solution (equivalent to 0.583 mole of BaS) that had been warmed to 70° C., 83 grams of commercial borax pentahydrate which, based on its assay, was equivalent to 0.291 mole of $Na_2B_4O_7 \cdot 5H_2O$, followed by 46.8 grams of liquid sodium silicate A ($Na_2$:3.75$SiO_2$ containing 25.3 percent of $SiO_2$), which mixture was maintained with stirring and heating at 70° C., while precipitation progressed. The autoclave was then sealed and the heating rate was increased so that the mixture reached a temperature of 125° C. in 15 minutes, at which point the temperature was maintained between 125° and 140° C. with stirring for a period of three more hours. The autogenous pressure that developed during this period varied between 20 to 40 pounds per square inch (superatmospheric). At the end of this period, cold water was charged into the jacket of the autoclave in such amounts as to cool the mixture in the autoclave to 70° C. within a period of 20 to 25 minutes. The mixture was then transferred while still at this temperature to a Büchner funnel and filtered with suction. The filtrate weighed 496.7 grams. The filter cake was then washed with 1000 milliliters of cold water and sucked dry, then placed in an oven maintained at 140° to 150° C. to dry overnight. The filter cake weighed 231.4 grams before being placed in the oven.

The product was a homogeneous, free-flowing white solid, the particles of which were ground in a mortar and pestle to pass a 100-mesh screen.

The total weight of the dried product was 141.2 grams and it had a water content of 5.00 percent by weight that was still retained in the product.

Analysis of the product (converted to water-free basis) gave the following results in percentages by weight: BaO 65.7; $B_2O_3$ 30.20; $SiO_2$ 6.77; Na 0.22; S 0.13.

The ratio of barium oxide (BaO) to boron oxide ($B_2O_3$) by weight in the product was 2.18:1; the calculated ratio of BaO:$B_2O_3$ in BaO·$B_2O_3$ is 2.20:1.

The susceptibility of the product to extraction by water was determined by placing 5.0 grams of the product into 100 milliliters of water contained in a stoppered polyethylene bottle and shaking the suspension for two hours at prevailing room temperature. Thereafter the clear solution or extract was drawn off, and a second quantity of 100 milliliters of water was added and the mixture was shaken for an additional two hours. The two successive extracts were analyzed for barium, boron, and silica. The following results, expressed as grams per 100 milliliters of the respective extracts, were obtained:

|  | First extract, grams per 100 milliliters | Second extract, grams per 100 milliliters |
| --- | --- | --- |
| Total solids | 0.23 | 0.25 |
| BaO | 0.13 | 0.11 |
| $B_2O_3$ | 0.060 | 0.065 |
| $SiO_2$ | 0.014 | 0.013 |

The pH of the extracts were respectively 10.2 and 10.3. Under the same conditions, pure barium metaborate dissolves to the extent of approximately 0.8 gram (calculated at BaO·$B_2O_3$) per 100 milliliters of aqueous solution and the saturated solution has a pH of approximately 11.3.

EXAMPLE 2

In the same manner as described in preceding Example 1, 410.0 grams of a 15.5-percent barium sulfide solution (equivalent to 0.378 mole of BaS), 53.8 grams of commercial borax pentahydrate which, based on its assay, was equivalent to 0.189 mole of $Na_2B_4O_7 \cdot 5H_2O$, and 14.9 grams of liquid sodium silicate A were added to the autoclave and heated at 70° C. while precipitation progressed. It was then heated between 125° and 140° C. for 3 hours at these temperatures and recovered as described in Example 1.

Afer filtration, the filtrate weighed 358.3 grams; the wet filter cake weighed 119.4 grams. After drying the product, it weighed 82.1 grams (containing 6.02 percent water) and its physical characteristics were essentially the same as those of the product of Example 1, from which it differed principally only in its lower silica content.

Analysis of the product (converted to water-free basis) gave the following results in percentages by weight: BaO 66.5; $B_2O_3$ 31.55; $SiO_2$ 5.26; Na 0.29; S 0.43.

Ratio of BaO:$B_2O_3$ by weight in product: 2.11:1.

Extraction of the product thus prepared with water, as described hereinbefore, yielded the following results:

|  | First extract, grams per 100 milliliters | Second extract, grams per 100 milliliters |
| --- | --- | --- |
| Total solids | 0.23 | 0.20 |
| BaO | 0.13 | 0.12 |
| $B_2O_3$ | 0.050 | 0.048 |
| $SiO_2$ | 0.018 | 0.014 |
| pH of extract | 10.4 | 10.1 |

EXAMPLE 3

In the same manner as described in preceding Example 1, 320.3 grams of a 16.6-percent barium sulfide solution (equivalent to 0.314 mole of BaS), 44.7 grams of commercial borax pentahydrate which, based on its assay, was equivalent to 0.157 mole of $Na_2B_4O_7 \cdot 5H_2O$, and 49.6 grams of liquid sodium silicate A were added to the autoclave and heated at 70° C. while precipitation progressed and then for 3 hours at 125° to 140° C. as in preceding Example 1. The product was recovered as described in Example 1.

After filtration, the filtrate weighed 219.4 grams; the wet filter cake weighed 160.1 grams. The dried product (containing 7.59 percent water) weighed 79.1 grams and its physical characteristics were essentially the same as those of the product of Example 1, from which it differed principally only in its higher silica content.

Analysis of the product gave the following results in percentages by weight, converted to a water-free basis: BaO 62.85; $B_2O_3$ 28.10; $SiO_2$ 12.24; Na 0.40; S 0.12.

Ratio of BaO:$B_2O_3$ by weight in product: 2.24:1.

When the product was extracted with water as described hereinbefore, the results were as follows:

|  | First extract, grams per 100 milliliters | Second extract, grams per 100 milliliters |
| --- | --- | --- |
| Total solids | 0.18 | 0.20 |
| BaO | 0.10 | 0.11 |
| $B_2O_3$ | 0.041 | 0.041 |
| $SiO_2$ | 0.027 | 0.025 |
| pH of extract | 10.2 | 10.2 |

EXAMPLE 4

Into a flask containing 500 milliliters of water were added with constant stirring 100 grams of solid particulate barium metaborate (ratio BaO:$B_2O_3$, 2.20:1) and 33 grams of liquid sodium silicate A. The mixture was heated with constant stirring at 100° C. for 5 hours, after which it was cooled to 70° C. and filtered. The weight of the filtrate was 520 grams and the wet filter cake weighed 199 grams. After drying, the product weighed 107 grams (containing 5.4 percent water) and in its physical characteristics it was the equivalent of the product of Example 1.

Analysis of the product (not converted to a water-free basis) gave the following results in percentages by weight: BaO 58.2; $B_2O_3$ 24.9; $SiO_2$ 10.6; $H_2O$ 5.40; Na 0.10.

Ratio of BaO:$B_2O_3$ by weight in the product: 2.34:1.

Extraction of the product with water gave the following results:

|  | First extract, grams per 100 milliliters | Second extract, grams per 100 milliliters |
|---|---|---|
| Total solids | 0.32 | 0.30 |
| BaO | 0.150 | 0.132 |
| $B_2O_3$ | 0.076 | 0.065 |
| $SiO_2$ | 0.011 | 0.016 |
| Na | 0.001 |  |
| pH of extract | 10.1 | 10.1 |

EXAMPLE 5

Into a 300-gallon steam-jacketed stainless steel reactor provided with a stirrer containing 2060 pounds of barium sulfide solution assaying 15.15 percent BaS (1.84 pound moles) maintained at a temperature of 160° F. were added quickly 262 pounds of borax pentahydrate (0.92 pound mole by assay) and 146 pounds of liquid sodium silicate A. The reactor was then heated with continual stirring to 240° F. and maintained at this temperature for 5 hours, after which it was cooled to 160° F., the solid removed by filtration, washed with water, and dried.

The resulting product had the following characteristics:

Average particle diameter, as determined on the Fisher Sub-Sieve sizer, was 2.85 microns.

Chemical analysis, percent by weight: BaO 61.78; $B_2O_3$ 26.26; $SiO_2$ 8.36; $H_2O$ 7.68; Na 0.43; S 0.12.

Ratio of $BaO:B_2O_3$ by weight in product: 2.35:1.

Fifty (50) grams of this product was mixed with 400 milliliters of distilled water, shaken for 24 hours at 28° C., filtered, and the clear filtrate analyzed for BaO, $B_2O_3$, and $SiO_2$, and its pH was determined. The solid on the filter was then mixed again with 400 milliliters of distilled water and shaken again for a 24 hour period and this extraction procedure was repeated 20 times with the following results:

| Extraction number | BaO | $B_2O_3$ | $SiO_2$ | pH |
|---|---|---|---|---|
|  | Grams per 100 milliliters of solution |  |  |  |
| 1 | 0.13 | 0.068 | 0.014 | 10.2 |
| 2 | 0.10 | 0.046 | 0.017 | 10.4 |
| 3 | 0.088 | 0.036 | 0.020 | 10.4 |
| 4 | 0.092 | 0.042 | 0.021 | 10.4 |
| 5 | 0.11 | 0.044 | 0.022 | 10.6 |
| 6 | 0.11 | 0.052 | 0.023 | 10.6 |
| 7 | 0.11 | 0.045 | 0.024 | 10.7 |
| 8 | 0.11 | 0.049 | 0.026 | 10.6 |
| 9 | 0.11 | 0.047 | 0.022 | 10.3 |
| 10 | 0.11 | 0.046 | 0.021 | 10.6 |
| 11 | 0.11 | 0.046 | 0.021 |  |
| 12 | 0.098 | 0.038 | 0.021 | 10.3 |
| 13 | 0.099 | 0.040 | 0.022 | 10.4 |
| 14 | (1) | (1) | (1) | (1) |
| 15 | 0.091 | 0.036 | 0.023 | 10.4 |
| 16 | 0.094 | 0.037 | 0.024 |  |
| 17 | 0.11 | 0.043 | 0.024 | 10.2 |
| 18 | 0.11 | 0.043 | 0.028 | 10.3 |
| 19 | 0.10 | 0.040 | 0.026 | 10.3 |
| 20 | 0.094 | 0.038 | 0.024 | 10.2 |
| Average (No. 2 to 20) | 0.102 | 0.043 | 0.022 |  |

[1] Not analyzed.

The consistency of the foregoing results, which are typical of those of all products made in accordance with the processes of this invention and which are well within allowable limits of experimental error, indicate the silica-coated product in this respect to have attributes of a chemical compound, although the chemical reactivity of the substances extracted indicate them to be a mixture of barium metaborate and silica.

EXAMPLE 6

To a flask provided with a stirrer were added with stirring 600 grams of a 16.20-percent solution of barium sulfide (equivalent to 0.574 mole of BaS), 82.1 grams of technical borax pentahydrate which, based on its assay, was equivalent to 0.287 mole of $Na_2B_4O_7 \cdot 5H_2O$, and 454 grams of a solution of active silica prepared by deionization with Dowex 50W–X12 ion-exchange resin of a solution of liquid sodium silicate A diluted with water in such amount as to provide a solution containing 2.5 percent by weight of silica. This mixture was heated with continual stirring at 100° C. for a period of 3 hours, after which it was cooled to 70° C., and filtered through a Büchner funnel.

The washed wet filter cake was separated weighed 371 grams, which when dried at 150° C. for 4 hours, weighed 126 grams. Analysis of this product gave the following results: BaO 58.9; $B_2O_3$ 24.8; $SiO_2$ 9.4; $H_2O$ 6.58; Na 0.12.

Ratio of $BaO:B_2O_3$ by weight: 2.37:1.

The product of this example closely resembled in appearance and characteristics the product of Example 1.

Extraction of the product with water, in the same manner as described hereinbefore in Example 1, gave the following results:

|  | First extract, grams per 100 milliliters | Second extract grams per 100 milliliters |
|---|---|---|
| BaO | 0.163 | 0.140 |
| $B_2O_3$ | 0.073 | 0.074 |
| $SiO_2$ | 0.012 | 0.012 |
| Na | 0.003 | 0.002 |
| pH of extract | 10.2 | 10.1 |

Although the product contained sodium, the sodium undoubtedly came from the borax that was used, since the silica in this example was introduced in deionized form as active silica. The amount found in the product is less than that obtained in any of the preceding examples in which liquid sodium silicate had been used.

Examination of Products for Crystal Growth Tendencies

Powdered samples of silica-coated barium metaborate from Examples 1, 2, 3, and 5, and commercial grades of hydrated barium metaborate, barium tetraborate, and barium sesquiborate, and barium borosilicate which was prepared by fusion in the laboratory, were each treated as follows:

(1) One gram of particles of each solid was mixed with 10 milliliters of distilled water in a stoppered test tube and maintained at 37° C.

(2) One gram of particles of each solid was mixed with 10 milliliters of distilled water, the mixture was heated to 70° C., and 0.2 milliliter of concentrated 28-percent ammonia solution was added, the test tube was stoppered and allowed to stand at room temperature.

(3) One gram of particles of each solid was mixed with 10 milliliters of distilled water in a stoppered test tube and the mixture was heated to 100° C. each day and then allowed to cool and stand at room temperature until the following day.

Each of the tubes and their contents was examined periodically during a period of three weeks.

The silica-coated barium metaborate samples, when examined with a microscope under polarized light, contained some visible crystalline material having a size less than 5 microns in diameter. After three weeks, as outlined in each of the 3 treatments above, all samples of silica-coated barium metaborate were essentially unchanged in size or character when examined under a microscope.

The uncoated barium metaborate particles had a diameter less than 5 microns before being treated with water but, after three weeks, a great number of crystals having a diameter in excess of 100 microns appeared in each tube.

The barium sesquiborate particles had a diameter less than 5 microns before being treated with water but, after three weeks, a great number of crystals having a diameter in excess of 100 microns was present in each tube.

The barium tetraborate particles included small crystals less than 20 microns in diameter before being treated with water but, after three weeks, a great number of crystals having a diameter in excess of 100 microns was present in each tube.

The fused barium borosilicate sample was a glassy solid which had been ground so that its particles passed a 100-mesh screen. After three weeks of treatment, the particles were still primarily glassy but a few large crystals which had a size in excess of 200 microns in diameter were found by microscopic examination in each tube.

*Comparative Examples*

A series of experiments were performed to establish factors that affect the character and type of coating deposited on barium borates. In each of these experiments, 92 grams of solid barium metaborate particles (or 64 grams of barium sesquiborate) was suspended in 325 milliliters of water, to each of which was then added 8 grams of silica in the form of a liquid sodium silicate A, and, in one case (IV), liquid sodium silicate B (having a ratio of $Na_2O:SiO_2$ of 1:3.22), and, in the case of barium sesquiborate, 5.4 instead of 8.0 grams of silica in the form of liquid sodium silicate A.

The mixtures were then further treated as follows:

I. Stirred 2 hours at room temperature and the entire mixture dried in an oven at 105° C.
II. Stirred 2 hours at room temperature and the entire mixture was evaporated to dryness by heating at 50° C. at a subatmospheric pressure.
III. Stirred 2 hours at room temperatures, filtered on a Büchner funnel, washed with water and the wet cake dried at 105° C. in an oven.
IV. Same as I but liquid sodium silicate B $$(Na_2O:3.22SiO_2)$$

was used instead of liquid sodium silicate A.

V. Mixture was heated under reflux for a period of 2 hours and then evaporated and dried in an oven at 105° C.
VI. Same as I but barium sesquiborate (64 grams) and 5.4 grams of silica in the form of liquid sodium silicate A were used.

The sodium content of each of these products and the analysis of each of their first aqueous extracts are included in the following table:

| Experiment | I | II | III | IV | V | VI |
|---|---|---|---|---|---|---|
| Analysis of first extract, grams per 100 ml.: | | | | | | |
| BaO | 0.273 | 0.460 | 0.314 | 0.352 | 0.262 | 0.413 |
| $B_2O_3$ | 0.140 | 0.220 | 0.161 | 0.167 | 0.156 | 0.296 |
| $SiO_2$ | 0.013 | 0.017 | 0.016 | 0.010 | 0.009 | 0.020 |
| Na | 0.036 | 0.056 | 0.004 | 0.026 | 0.048 | 0.061 |
| pH | 10.2 | 10.8 | 10.4 | 10.7 | 9.8 | 9.6 |
| Analysis of solid product, percent by weight: | | | | | | |
| Na | 1.96 | 1.19 | 0.19 | 1.50 | 1.58 | 1.96 |

From the foregoing results, it is apparent that in none of these experiments was a product obtained which was as resistant to extraction or leaching by water and as free from alkali-metal as were the products described in the preceding examples, and that heating and washing of the coated particles are requisites of our processes.

Inasmuch as the foregoing specification comprises preferred embodiments of the invention, which were selected merely for purposes of illustration, it is to be understood that variations and modifications may be made therein in conventional manner and in accordance with the teachings thereof, without departing from the invention or its scope as defined in the appended claims.

We claim:
1. A process for the production of a silica-coated barium metaborate pigment in particulate form, which comprises commingling in an aqueous medium barium metaborate particles with a silicate selected from the group consisting of liquid alkali-metal silicates having a ratio by weight of silica to alkali metal computed as alkali-metal oxide between 2.50:1 and 4.10:1 and deionized preparations of such alkali-metal silicates, the silicate in a proportion computed as silica between approximately 3 and approximately 25 percent by weight of the barium metaborate, heating the said mixture at a temperature between approximately 75° C. and approximately 200° C. for a period between approximately 1 and approximately 6 hours, and subsequently separating the particulate solid product from the aqueous medium and drying the same.

2. A process for the production of a silica-coated barium metaborate pigment in particulate form which comprises mixing a liquid alkali-metal silicate having a ratio by weight of silica to alkali metal computed as alkali-metal oxide between 2.50:1 and 4.10:1 in an aqueous medium with barium metaborate particles, the silicate in a proportion computed as silica between approximately 3 and approximately 25 percent by weight of the barium metaborate, heating the said mixture at a temperature between approximately 75 and approximately 200° C. for a period of time sufficient to deposit upon the barium metaborate particles a coherent layer consisting essentially of amorphous hydrated silica containing not more than 15 percent by weight of alkali metal that is pervious to water, and subsequently separating the particulate solid product from the aqueous medium and drying the solid particles.

3. A process as defined in claim 2 in which the alkali-metal silicate is a liquid sodium silicate.

4. A process as defined in claim 2 in which the alkali-metal silicate is a liquid potassium silicate.

5. A process for the production of a silica-coated barium metaborate pigment in particulate form, which comprises commingling barium sulfide, borax, and a liquid alkali-metal silicate having a ratio by weight of silica to alkali metal computed as alkali-metal oxide between 2.50:1 and 4.10:1 in an aqueous medium, in such proportions that the barium sulfide and borax react to produce barium metaborate without substantial amounts of other barium borates, and that the liquid alkali-metal silicate is present in a proportion corresponding to between approximately 3 and approximately 25 percent by weight of silica based on the weight of barium metaborate which is produced, heating the mixture at a temperature between approximately 75° C. and approximately 200° C. for a period between approximately 1 and approximately 6 hours, and subsequently separating the particulate solid product from the aqueous medium and drying the same.

References Cited in the file of this patent

UNITED STATES PATENTS

| 2,296,637 | Hanahan | Sept. 22, 1942 |
| 2,357,089 | Daiger | Aug. 29, 1944 |
| 2,818,344 | Buckman | Dec. 31, 1957 |
| 2,885,366 | Iler | May 5, 1959 |

FOREIGN PATENTS

| 488,274 | Great Britain | Sept. 30, 1936 |